US010239999B2

(12) United States Patent
Li et al.

(10) Patent No.: US 10,239,999 B2
(45) Date of Patent: *Mar. 26, 2019

(54) CURABLE RESIN, SPACER COMPOSITION, FILTER, METHODS OF PREPARING THE SAME, AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Hongyan Li, Beijing (CN); Jiuxia Yang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 338 days.

This patent is subject to a terminal disclaimer.

(21) Appl. No.: 14/389,225

(22) PCT Filed: Dec. 14, 2013

(86) PCT No.: PCT/CN2013/089460
§ 371 (c)(1),
(2) Date: Sep. 29, 2014

(87) PCT Pub. No.: WO2014/194635
PCT Pub. Date: Dec. 11, 2014

(65) Prior Publication Data
US 2016/0208049 A1 Jul. 21, 2016

(30) Foreign Application Priority Data

Jun. 6, 2013 (CN) .......................... 2013 1 0224773

(51) Int. Cl.
C08G 73/10 (2006.01)
G02B 5/20 (2006.01)
G02B 5/22 (2006.01)
C09D 179/08 (2006.01)
C08G 73/14 (2006.01)

(52) U.S. Cl.
CPC ..... C08G 73/1067 (2013.01); C08G 73/1007 (2013.01); C08G 73/1039 (2013.01); C08G 73/14 (2013.01); C09D 179/08 (2013.01); G02B 5/201 (2013.01); G02B 5/223 (2013.01)

(58) Field of Classification Search
CPC . C08F 2810/20; C08L 77/00; C08G 73/1067; C09J 135/06
See application file for complete search history.

(56) References Cited

U.S. PATENT DOCUMENTS

| 4,430,418 | A | * | 2/1984 | Goff | C08F 290/14 430/281.1 |
|---|---|---|---|---|---|
| 5,034,503 | A | | 7/1991 | Camberlin | |
| 7,648,815 | B2 | | 1/2010 | Itatani et al. | |
| 2004/0041129 | A1 | | 3/2004 | Itatani et al. | |
| 2004/0225026 | A1 | * | 11/2004 | Mizori | C07D 207/452 522/99 |
| 2007/0019150 | A1 | | 1/2007 | Slikkerveer et al. | |
| 2007/0259278 | A1 | | 11/2007 | Kura et al. | |
| 2008/0108723 | A1 | * | 5/2008 | Taniguchi | C08G 73/101 522/152 |
| 2010/0073609 | A1 | * | 3/2010 | Matsumori | G02F 1/133528 349/96 |
| 2010/0305230 | A1 | | 12/2010 | Li et al. | |
| 2012/0133061 | A1 | * | 5/2012 | Mitsukura | C08G 73/1039 257/798 |

FOREIGN PATENT DOCUMENTS

| CN | 1547683 A | 11/2004 |
|---|---|---|
| CN | 1548474 A | 11/2004 |
| CN | 1846164 A | 10/2006 |
| CN | 102492320 A | 6/2012 |
| CN | 102645689 A | 8/2012 |
| CN | 102770464 A | 11/2012 |
| CN | 103052916 A | 4/2013 |
| CN | 103304810 A | 9/2013 |
| CN | 103304811 A | 9/2013 |
| CN | 103304812 A | 9/2013 |
| CN | 103304813 A | 9/2013 |
| CN | 103319713 A | 9/2013 |
| EP | 0140273 B1 | 5/1985 |
| KR | 101357333 B1 | 2/2014 |

OTHER PUBLICATIONS

First Chinese Office Action Appln. No. 201310224773.3; dated Jan. 7, 2015.
D.A. Sapozhnikov, et al; "Photopolyrnerization of (Meth)Acrylates in the Presence of Polyheteroaryienes", Polymer Science, Ser. B., vol. 51, No. 1-2, pp. 1-12, Feb. 2009.
International Search Report dated Dec. 3, 2014; PCT/CN2013/089460.
International Preliminary Report on Patentability dated Dec. 8, 2015; PCT/CN2013/089460.
Xuan He, et al; "Research on the Photoresist for the Color Filter", Advanced Display, Jan./Feb. 2008, 4 pages.
Hong-Yan Li, et al; "Color Filter for TFT-LCD", Advanced Display, Jun. 2005, 4 pages.

(Continued)

Primary Examiner — Gregory Listvoyb
(74) Attorney, Agent, or Firm — Ladas & Parry LLP; Loren K. Thompson

(57) ABSTRACT

Disclosed are a curable resin, a spacer composition, a filter, methods of preparing the same, a filter and a method of preparing the same, and a display device. The curable resin includes 1 part by weight of dianhydride, 0.6 to 2 parts by weight of diamine, and 0.8 to 3 parts by weight of vinyl monomer.

17 Claims, 1 Drawing Sheet

(56) References Cited

OTHER PUBLICATIONS

Yong Wang, et al; "Applications of Polyimide Film in Liquid Crystal Display", Advanced Display, Apr. 2013, 3 pages.
International Search Report and Written Opinion dated Apr. 3, 2014; PCT/CN2013/090899.
International Preliminary Report on Patentability dated Dec. 8, 2015; PCT/CN2013/090899.
The First Chinese Office Action dated Dec. 9, 2014; Appln. No. 201310224624.7.
USPTO RR dated Jul. 11, 2016 in connection with U.S. Appl. No. 14/387,807.
USPTO NFOA dated Oct. 27, 2016 in connection with U.S. Appl. No. 14/387,807.
USPTO Issue Notification dated May 17, 2017 in connection with U.S. Appl. No. 14/387,807.

* cited by examiner

CURABLE RESIN, SPACER COMPOSITION, FILTER, METHODS OF PREPARING THE SAME, AND DISPLAY DEVICE

INVENTION FIELD

Embodiments of the present invention relate to a curable resin, a spacer composition, a filter, methods of preparing the same, and a display device.

BACKGROUND

Thin Film Transistor-Liquid Crystal Displays (TFT-LCDs) have become predominant by advantage of their low power consumption, high quality of image, and ease to carry, etc. In TFT-LCDs, liquid crystal display panels are formed by assembling a color filter and an array substrate together, and sandwiching a liquid crystal layer therebetween. Of those, the color filter is an essential component for achieving a color display, and comprised primarily of substrate, Black Matrix (BM), filter layer, transparent conductive film layer, and spacer, wherein the spacer is used to control the gap between two substrates so as to retain an optimal thickness of the liquid crystal layer.

Currently, the most commonly used spacers are those prepared from resin compositions, and the raw materials thereof comprise generally unsaturated monomers, alkali-soluble resins, high boiling point solvents, and the like. Accordingly, the preparation of spacer requires a relatively high curing temperature (up to 200° C. or higher). On the one hand, it is used for volatilization of solvent during reaction process, and on the other hand it is used for a good curing of resins and a complete reaction of residual unsaturated bonds. However, it enhances the product cost, while causing relatively high power consumption. Moreover, for ensuring the reliability of products, the raw materials as used should have a high thermal resistance under such process conditions.

SUMMARY OF INVENTION

To address the aforesaid problems, embodiments of the present invention provide a curable resin, a spacer composition comprising the curable resin, a spacer formed from the spacer composition, a filter comprising the spacer, methods of preparing them, and a display device comprising the filter.

An embodiment of the present invention provides a curable resin comprising:
1 part by weight of dianhydride;
0.6 to 2 parts by weight of diamine; and
0.8 to 3 parts by weight of vinyl monomer.

Of those, the dianhydride is selected from the group consisting of pyromellitic dianhydride, trimellitic anhydride, benzophenone tetracarboxylic dianhydride, biphenyl tetracarboxylic dianhydride, tetracarboxydiphthalic ether dianhydride (ODPA), and (hexafluoroisopropylidene)diphthalic anhydride.

The diamine is selected from the group consisting of 3-aminobenzylamine, 2,2'-difluoro-4,4'-(9-fluorenylidene)diphenylamine, 2,2-bis(3-amino-4-hydroxyphenyl)hexafluoropropane, hexahydro-m-xylenediamine, 1,4-bis(aminomethyl)cyclohexane, 2,2-bis[4-(4-aminophenoxy)phenyl]hexafluoropropane, 2,2-bis(3-amino-4-tolyl)hexafluoropropane, 2,2-bis(3-aminophenyl)hexafluoropropane, 2,2-bis(4-aminophenyl)hexafluoropropane, 2,7-diaminofluorene, m-xylenediamine or 4,4'-methylenebis(2-ethyl-6-methylaniline).

The vinyl monomer is selected from the group consisting of vinyl chloride, styrene, methyl methacrylate, maleimide, butadiene, methyl acrylate, epoxy acrylate or bisphenol A type epoxy methacrylate.

Another embodiment of the present invention provides a method of preparing the curable resin comprising the steps of
reacting a dianhydride with a diamine in the presence of a solvent to give a polyimide resin; and
allowing the polyimide resin and a vinyl monomer to undergo a Michael addition reaction in the presence of a solvent to give the desired curable resin.

In an aspect, the polyimide resin is reacted with the vinyl monomer under a protective atmosphere at a temperature of 50° C. to 300° C. for 0.5 to 5 hr.

Another embodiment of the present invention provides a spacer composition comprising: 2 to 30 parts by weight of the curable resin of the embodiment of the present invention or prepared by the method of the embodiment of the present invention; 30 to 90 parts by weight of a solvent; 0.01 to 1 part by weight of an initiator; and 0.05 to 2 parts by weight of additives.

In an aspect, the solvent has a boiling point of 30-90° C. at an atmospheric pressure. The solvent can be one or more selected from the group consisting of diethyl ether, pentane, dichloromethane, carbon disulfide, acetone, 1,1-dichloroethane, chloroform, methanol, tetrahydrofuran, n-hexane, trifluoroacetic acid, 1,1,1-trichloroethane, carbon tetrachloride, ethyl acetate, ethanol, butanone, cyclohexane, isopropanol, 1,2-dichloroethane, ethylene glycol dimethyl ether, trichloroethylene, and triethylamine.

In another aspect, the initiator is one or more selected from the group consisting of α-amino ketone-based photoinitiators, acylphosphine oxide-based photoinitiators, α-hydroxy ketone-based photoinitiators, and benzoyl formate-based photoinitiators.

Another embodiment of the present invention provides a method of preparing the spacer composition comprising:
mixing the curable resin, the solvent, the initiator and the additives homogeneously;
degassing (defoaming) the homogeneously mixed raw materials to give a mixture; and
filtering the resultant mixture to remove impurities to give the spacer composition.

Another embodiment of the present invention provides a filter comprising a substrate as well as a Black Matrix, a filter layer, a transparent conductive film layer, and a spacer arranged sequentially on the substrate, wherein the spacer is formed from the spacer composition of the embodiment of the present invention or prepared by the method of the embodiment of the present invention.

Another embodiment of the present invention provides a method of preparing the filter comprising: forming sequentially a Black Matrix and a filter layer on the substrate; forming a transparent conductive film layer on the substrate having the Black Matrix and the filter layer formed thereon; and forming a spacer on the substrate having the transparent conductive film layer to give the filter.

In an aspect, forming the spacer on the substrate having the transparent conductive film layer comprises a pre-baking operation and a curing operation, wherein the pre-baking operation is carried out at a temperature of 20° C. to 50° C. for 30 to 120 seconds; and the curing operation is carried out at a temperature of 20° C. to 100° C. for 5 to 30 min.

Another embodiment of the present invention provides a display device comprising the filter of the embodiment of the present invention or prepared by the method of the embodiment of the present invention.

The curable resin of the embodiments of the present invention addresses the problem that the resins prepared with conventional methods and raw materials require to be cured at high temperature, and allow the end product resin to be cured at a relatively low temperature in a range of 20° C. to 100° C. Using such curable resin as the raw material of a spacer composition can not only save the energy consumption required during the curing of the spacer composition to form a spacer, but also allow other raw materials used in the production to have relatively low thermal resistance, thereby further reducing the product cost.

BRIEF DESCRIPTION OF DRAWINGS

To illustrate the embodiments of the present invention or the prior art more detailedly, hereinafter the drawings are briefly described. It is apparent that the following drawings are only some embodiments of the present invention, and persons skilled in the art can obtain other drawings in accordance with these accompanying drawings without any creative work.

DETAILED DESCRIPTION OF INVENTION

Figure 1:
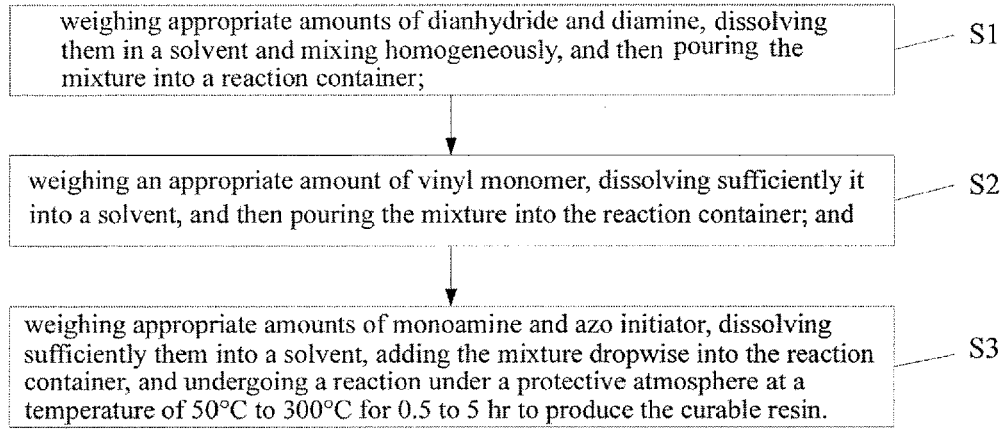
FIG. 1 is a method of preparing the curable resin of an embodiment of the present invention.

Hereinafter, with reference to the drawings of an embodiment of the present invention, the technical solutions of an embodiment of the present invention are clearly and completely described. It is apparent that the described embodiments are not all, but only some examples of the present invention. Based on the embodiments of the present invention, any other embodiment made by a person of ordinary skill in the art without any creative work falls with the scope of the invention.

Hereinafter with reference to the drawings, the curable resin, the spacer composition, the filter, the methods of preparing the same, and the display devices of embodiments of the present invention are described in details.

An embodiment of the present invention provides a curable resin comprising: 1 part by weight of dianhydride, 0.6 to 2 parts by weight of diamine, and 0.8 to 3 parts by weight of vinyl monomer, wherein the dianhydride is selected from the group consisting of pyromellitic dianhydride, trimellitic anhydride, benzophenone tetracarboxylic dianhydride, biphenyl tetracarboxylic dianhydride, tetracarboxydiphthalic ether dianhydride (ODPA) or (hexafluoroisopropylidene)diphthalic anhydride; the diamine is selected from the group consisting of 3-aminobenzylamine, 2,2'-difluoro-4,4'-(9-fluorenylidene)diphenylamide, 2,2-bis(3-amino-4-hydroxyphenyl)hexafluoropropane, hexahydro-m-xylenediamine, 1,4-bis(aminomethyl)cyclohexane, 2,2-bis [4-(4-aminophenoxy)phenyl]hexafluoropropane, 2,2-bis (3-amino-4-tolyl)hexafluoropropane, 2,2-bis(3-aminophenyl)hexafluoropropane, 2,2-bis(4-aminophenyl) hexafluoropropane, 2,7-diaminofluorene, m-xylenediamine or 4,4'-methylenebis(2-ethyl-6-methylaniline); and the vinyl monomer is selected from the group consisting of vinyl chloride, styrene, methyl methacrylate, maleimide, butadiene, methyl acrylate, epoxy acrylate or bisphenol A type epoxy methacrylate.

During the preparation of the curable resin, dianhydride and diamine undergo first a condensation reaction to produce a polyimide resin that is subsequently reacted with a vinyl monomer to undergo a Michael additional reaction, thereby producing the desired curable resin. The polyimide resin has a structure of:

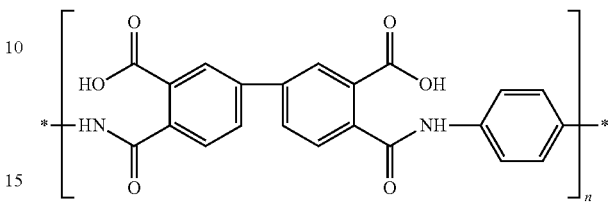

wherein n is 75 to 450, e.g., 75 to 375, or 75 to 300. For instance, n=100, 120, 150, 180, 230, 245 or 270.

The curable resin of an embodiment of the present invention is prepared through a condensation reaction of dianhydride, diamine, and vinyl monomer, and having a curing temperature ranging from 20° C. to 100° C. As compared with conventional curable resins, such curable resin addresses the problem that the resins prepared with conventional methods and raw materials require to be cured at high temperature, and can be cured at a relatively low temperature. Using such curable resin as the raw materials of a spacer composition can not only save the energy consumption required in the curing of a spacer composition for forming a spacer, but also allow other raw materials used in the production to have relatively low thermal resistance, thereby further reducing the production cost.

As shown in FIG. 1, the curable resin can be prepared by, e.g., a method comprising:

Step S1: weighing appropriate amounts of dianhydride and diamine, dissolving them in a solvent and mixing homogeneously, and then pouring the mixture into a reaction container;

Step S2: weighing an appropriate amount of vinyl monomer, dissolving sufficiently it into a solvent, and then pouring the mixture into the reaction container; and Step S3: weighing appropriate amounts of monoamine and azo initiator, dissolving sufficiently them into a solvent, adding the mixture dropwise into the reaction container, and undergoing a reaction under a protective gas at a temperature of 50° C. to 300° C. for 0.5 to 5 hr to produce the curable resin.

Of those, in step S1, the dianhydride and diamine can be 1 part by weight and 0.6 to 2 parts by weight, respectively; in step S2, the weight ratio of vinyl monomer to dianhydride can be 0.8 to 3:1; and in step S3, the weight ratio of monoamine, azo initiator, and dianhydride can be 0.6 to 2:0.06 to 0.3:1, wherein the monoamine can be selected from the group consisting of alkyl monoamines or aromatic monoamines.

In the aforesaid steps S1, S2, and S3, the solvents as used are slightly excess, as long as the reaction can be sufficiently carried out or the raw materials can be sufficiently dissolved. For instance, in step S1, the weight ratio of solvent to dianhydride can be 50 to 400:1; in step S2, the weight ratio of solvent to vinyl monomer can be 20 to 35:1; and in step S3, the weight ratio of solvent to monoamine and azo initiator can be 2 to 5:0.6 to 2:0.06 to 0.3.

Moreover, in step S3, the azo initiator is used to initiate the reaction between the polyimide resin prepared by the reaction of dianhydride with diamine and the vinyl monomer, and the monoamine is used to adjust the molecular weight of the final curable resin. Thus, the two materials are used in relatively small amounts, and added dropwise, so as to control the target molecular weight of the final curable resin. The protective gas can be nitrogen so as to avoid the interference of oxygen in the reaction container to the reaction.

The method of preparing the curable resin of the embodiment of the present invention has the following advantages: the raw materials of dianhydride and diamine for preparing a polyimide resin in the method have a wide range of resources and can be obtained from a simple synthetic process. The end product curable resin from the addition reaction between the polyimide and the vinyl monomer addresses the problem that the resins prepared with conventional methods and raw materials require to be cured at high temperature, and achieves the low-temperature curing of the curable resin. The curable resin prepared in accordance with the method can substantially reduce the energy consumption during the production of filter, thereby reducing the cost.

Another embodiment of the present invention further provides a spacer composition comprising 2 to 30 parts by weight of the curable resin of the embodiment of the present invention, 30 to 90 parts by weight of a solvent, 0.01 to 1 part by weight of an initiator, and 0.05 to 2 parts by weight of additives.

In an aspect, the solvent is a solvent having a low boiling point, e.g., 30-90° C., at an atmospheric pressure. For instance, the solvent can be one or more selected from the group consisting of diethyl ether, pentane, dichloromethane, carbon disulfide, acetone, 1,1-dichloroethane, chloroform, methanol, tetrahydrofuran, n-hexane, trifluoroacetic acid, 1,1,1-trichloroethane, carbon tetrachloride, ethyl acetate, ethanol, butanone, cyclohexane, isopropanol, 1,2-dichloroethane, ethylene glycol dimethyl ether, trichloroethylene, and triethylamine.

In another aspect, the initiator can be one or more selected from the group consisting of: α-aminoketone-based photoinitiators: Irgacure 907, Igracure 369 or Irgacure 1300; or acylphosphine oxide-based photoinitiators: Irgacure 819, Irgacure 819DW, Irgacure 2010, Darocur TPO or Darocur 4265; α-hydroxyketone-based photoinitiators: Darocur 1173, Irgacure 184, Irgacure 2959, Irgacure 500 or Irgacure 1000; or benzoyl formate-based photoinitiators: Darocur mbf or Irgacure 754.

In another aspect, the additives can be one or more selected from the group consisting of adhesion promotor, leveling agent, and wetting agent.

For instance, for improving the adhesion to the surface of glass, the adhesion promoter can be one or more selected from the group consisting of the following adhesion promotors: γ-(2,3-epoxypropoxy)propyltrimethoxysilane, β(3,4-epoxycyclohexane)ethyltrimethoxysilane, γ-aminopropyltriethoxysilane, long chain alkyl trimethoxysilane, vinyltriethoxysilane, vinyltrimethoxysilane, γ-chloropropyltriethoxysilane, bis-(γ-triethoxysilylpropyl)tetrasulfide, anilinemethyltriethoxysilane, N-β-(aminoethyl)-γ-aminopropyltrimethoxysilane, N-(β-aminoethyl)-γ-aminopropyltriethoxysilane, N-β-(aminoethyl)-γ-aminopropylmethyldimethoxysilane, γ-(2,3-epoxypropoxy) propyltrimethoxysilane, γ-(methylacryloyloxy) propyltrimethylsilane, γ-mercaptopropyltrimethoxysilane or γ-mercaptopropyltriethoxysilane.

Optionally, e.g., for improving the surface properties of the film during film formation of color photoresist, a small amount of leveling agent and wetting agent can be added, such as, one or more selected from the group consisting of organosiloxane wetting agents, fluorocarbon-modified polyacrylate leveling agents or acrylic leveling agents.

The spacer composition of the embodiment of the present invention incorporates the curable resin having a relatively curing temperature, which co-operates with given amounts of other components in the formulation to achieve a relatively low curing temperature of 20 to 100° C. in the process of curing the spacer composition to form a spacer, thereby reducing effectively the energy consumption required in the production of filter and reducing the cost. The formulation of the spacer composition of the embodiment of the present invention comprises not only the curable resin having a relatively low curing temperature but also a low boiling point solvent, as compared with the conventional spacer composition. Such low boiling point solvent present in the formulation can assist the curable resin to meet the requirement of low temperature curing so that the spacer composition can achieve low temperature curing during its curing to form a spacer, thereby saving the energy consumption during the production.

Figure 2:
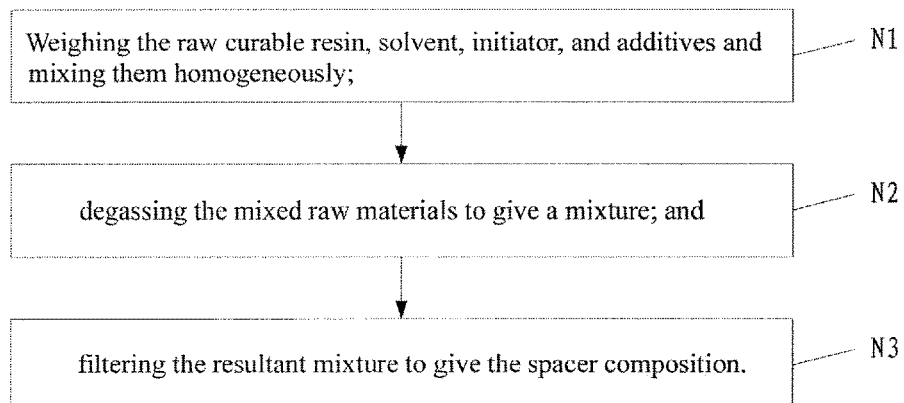
FIG. 2 is a method of preparing the spacer composition of an embodiment of the present invention.

As shown in FIG. 2, e.g., the spacer composition can be prepared by a method comprising:

Step N1: weighing the raw curable resin, solvent, initiator, and additives and mixing them homogeneously;

Step N2: degassing the mixed raw materials to give a mixture; and

Step N3: filtering the mixture to give the spacer composition.

Of those, in step N1, the weight ratio of curable resin, solvent, initiator, and additives can be 2 to 30:20 to 90:0.01 to 1:0.05 to 2, preferably 5 to 30:40 to 90:0.01 to 1:0.05 to 1.5, more preferably 5 to 25:45 to 90:0.01 to 1:0.1 to 1.5 parts. It can be understood that the amounts of components in the embodiment of the present invention are preferable formulation of the spacer composition, but not limited to those formulations. Persons skilled in the art can determine or adjust the amounts of the components in accordance with the disclosure of the present invention, as well as common knowledge or conventional technical means in the art.

In step N2, the mixed raw materials obtained in step N1 can be degassed in a degassing box to remove the gas bubbles in the raw materials so that the raw materials are homogeneously mixed and dispersed. For instance, the raw materials can be degassed once or twice, each for 10 to 30 min. It can be understood that the embodiment of the present invention is not limited to these, and persons skilled in the art can determine or adjust the number and time of degassing step in accordance with the disclosure of the present invention, as well as common knowledge or conventional technical means in the art.

In step N3, the mixture is filtered to remove the insoluble materials therein so that the mixture becomes fine and smooth on the whole.

The method of preparing the spacer composition of the embodiment of the present invention has the following advantages: the method is simple, easy for handling, and the spacer composition prepared in accordance with such method can be cured at a relatively low temperature to form a spacer, thereby saving the energy consumption required during the production of filter and reducing the cost.

Another embodiment of the present invention further provides a filter comprising a substrate; and a Black Matrix, a filter layer, a transparent conductive film layer and a spacer arranged sequentially on the substrate, wherein the spacer is formed from the spacer composition of the embodiment of the present invention or prepared in accordance with the process of the embodiment of the present invention.

Figure 3:
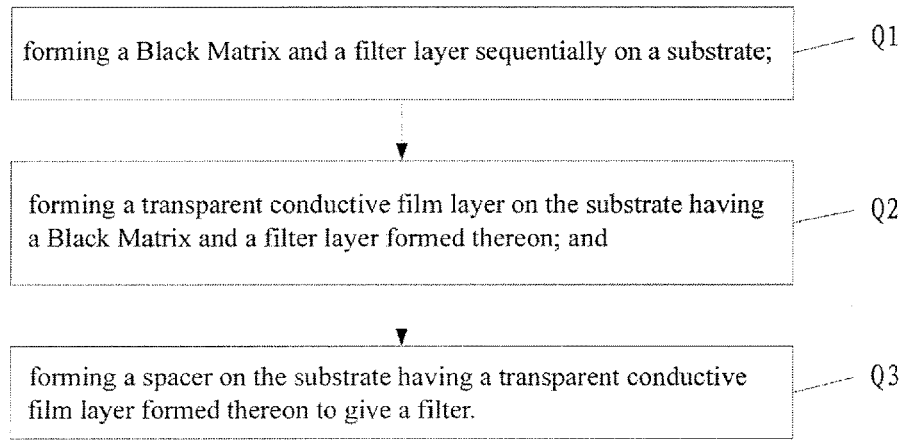
FIG. 3 is a method of preparing the filter of an embodiment of the present invention.

For example, as shown in FIG. 3, the filter can be produced by a method comprising:

Step Q1: forming a Black Matrix and a filter layer sequentially on a substrate;

Step Q2: forming a transparent conductive film layer on the substrate having a Black Matrix and a filter layer formed thereon; and Step Q3: forming a spacer on the substrate having a transparent conductive film layer formed thereon to give a filter.

In step Q3, the step of forming a spacer on the substrate having a transparent conductive film layer formed thereon comprises a pre-baking operation and a curing operation. For instance, the pre-baking can be carried out at a temperature of 20° C. to 50° C. for 30 to 120 seconds. For instance, the curing operation can be carried out at a temperature of 20° C. to 100° C. for 5 to 30 min, preferably at a temperature of 20° C. to 80° C. for 5 to 20 min, more preferably at a temperature of 20° C. to 60° C. for 5 to 15 min.

It can be understood that the embodiment of the present invention is not limited thereto. Persons skilled in the art can select the reaction conditions of various steps in accordance with the disclosure of the present invention and common knowledge or conventional technical means in the art.

The method of preparing a filter of the embodiment of the present invention has the following advantages: the incorporation of a curable resin having a low curing temperature in the process of preparing the filter allow the spacer to be cured at a low temperature, thereby reducing the energy consumption during the production of filter and reducing the production cost of display device.

Another embodiment of the present invention further provides a display device comprising the filter of the embodiment of the present invention.

For better illustration, the present invention is described in details with reference to examples. Unless otherwise indicated, the parts in the examples are all parts by weight.

EXAMPLE 1

Preparation of Curable Resin

First, 1 part of pyromellitic dianhydride and 0.8 parts of 2,2-bis(3-amino-4-tolyphexafluoropropane4,4'-methylenebis(2-ethyl-6-methyl a niline) were weighed, dissolved in 52 parts of ethylene glycol dimethyl ether, and mixed homogeneously. The mixture was poured into a four-neck flask having a heater, a reflux device, a stirrer, and a dropping device. Then, 0.8 parts of maleimide were weighed and dissolved sufficiently in 20 parts of cyclohexane. The mixture was also poured into the reaction container. Finally, 0.6 parts of octadecylamine and 0.06 parts of 2,2'-azobis-(2-methylbutyronitrile) (AMBN) were weighed, dissolved sufficiently in 2.5 parts of ethylene glycol dimethyl ether, and added dropwise into the four-neck flask. The mixture underwent a reaction under a protective nitrogen atmosphere at a temperature of 80° C. for 2.5 hr to produce the curable resin.

The curable resin was analyzed by Gel Permeation Chromatograph (GPC). It was indicated that the molecular weight of the curable resin was 67750.72 (measured) and 67750.20 (calculated).

Preparation of Spacer Compsotion

First, 8 parts of curable resin, 50 parts of solvent, 0.02 parts of initiator, and 0.3 parts of additives were weighed, stirred, and mixed homogeneously. Then, the mixed raw materials were degassed twice, each for 15 min, to give a mixture. The resultant mixture was filtered to remove impurities to give a spacer composition.

Preparation of Filter

First, a Black Matrix and a filter layer were formed on a substrate, respectively. Then, a transparent conductive film layer was formed on the substrate having a Black Matrix and a filter layer formed thereon. Finally, the spacer composition as prepared above was applied onto the substrate having a transparent conductive film layer formed thereon to a thickness of 3.15 microns, pre-baked at 40° C. for 70 seconds, and then cured at 90° C. to form a spacer, thereby giving a filter.

EXAMPLE 2

Preparation of Curable Resin

First, 1 part of benzophenone tetracarboxylic dianhydride and 1.2 parts of 4,4'-methylenebis(2-ethyl-6-methylaniline) were weighed, and dissolved in 80 parts of 1,1,1-trichloroethane, mixed homogeneously, and poured into a four-neck flask having a heater, a reflux device, a stirrer, and a dropping device. Then, 1.2 parts of methyl acrylate was weighed and dissolved sufficiently in 25 parts of cyclohexane, and also poured into the reaction container. Finally, 0.8 parts of octadecylamine and 0.12 parts of AMBN were weighed, dissolved sufficiently in 3.2 parts of 1,1,1-trichloroethane, and added dropped into the four-neck flask. The mixture underwent a reaction under a protective nitrogen atmosphere at a temperature of 120° C. for 2 hr to produce the curable resin.

The curable resin was analyzed by GPC. It was indicated that the molecular weight of the curable resin was 68872.44 (measured) and 68872.08 (calculated).

Preparation of Spacer Compsotion

First, 12 parts of curable resin, 72 parts of solvent, 0.05 parts of initiator, and 0.5 parts of additives were weighed, stirred, and mixed homogeneously. Then, the mixed raw materials were degassed twice, each for 15 min, to give a mixture. The resultant mixture was filtered to remove impurities to give a spacer composition.

Preparation of Filter

First, a Black Matrix and a filter layer were formed on a substrate, respectively. Then, a transparent conductive film layer was formed on the substrate having a Black Matrix and a filter layer formed thereon. Finally, the spacer composition as prepared above was applied onto the substrate having a transparent conductive film layer formed thereon to a thickness of 3.15 microns, pre-baked at 40° C. for 85 seconds, and then cured at 80° C. to form a spacer, thereby giving a filter.

EXAMPLE 3

Preparation of Curable Resin

First, 1 part of trimellitic anhydride and 1.2 parts of 2,2-bis(3-aminophenyl)hexafluoropropane were weighed, and dissolved in 120 parts of dichloromethane, mixed homogeneously, and poured into a four-neck flask having a heater, a reflux device, a stirrer, and a dropping device. Then, 1.5 parts of maleimide was weighed and dissolved sufficiently in 27.5 parts of cyclohexane, and also poured into the reaction container. Finally, 1.0 parts of octadecylamine and 0.15 parts of AMBN were weighed, dissolved sufficiently in 4 parts of dichloromethane, and added dropped into the four-neck flask. The mixture underwent a reaction under a protective nitrogen atmosphere at a temperature of 150° C. for 2 hr to produce the curable resin.

The curable resin was analyzed by GPC. It was indicated that the molecular weight of the curable resin was 65151.32 (measured) and 65151.14 (calculated).

Preparation of Spacer Compsotion

First, 20 parts of curable resin, 82 parts of solvent, 0.07 parts of initiator, and 0.5 parts of additives were weighed, stirred, and mixed homogeneously. Then, the mixed raw materials were degassed twice, each for 15 min, to give a mixture. The resultant mixture was filtered to remove impurities to give a spacer composition.

Preparation of Filter

First, a Black Matrix and a filter layer were formed on a substrate, respectively. Then, a transparent conductive film layer was formed on the substrate having a Black Matrix and a filter layer formed thereon. Finally, the spacer composition as prepared above was applied onto the substrate having a transparent conductive film layer formed thereon to a thickness of 3.15 microns, pre-baked at 40° C. for 90 seconds, and then cured at 55° C. to form a spacer, thereby giving a filter.

Performance Test

1) Test for Chemical Resistance

The filters of Examples 1 to 3 were subject to a test for chemical resistance. The test steps were as follows:

Each filter was cut to give two pieces of specimens having a dimension of 10 cm×10 cm, which were assigned as A and B, respectively.

The specimens A and B were placed in a 5% NaOH solution (or a 5% isopropanol solution) at room temperature for 20 min. Then, the specimens were removed, washed, and completely dried at 50° C. Each treated specimen was placed in a spectrometer which was focused, and then measured for the transmission of each of specimens A and B. The experimental results were shown in Table 1.

TABLE 1

Transmission of Specimens of Various Filters of Examples 1 to 3

| | Example 1 | | Example 2 | | Example 3 | |
|---|---|---|---|---|---|---|
| | A | B | A | B | A | B |
| Transmission | 95 | 93 | 92 | 91 | 91 | 90 |

Chemical Resistance refers to the ability that the filter resists corrosion under acidic, basic, or solvent conditions, which is one of the reliable indice of the filter in subsequent processes. Transmission is the ratio of the radiant energy projecting and passing an object during the procedure of incident flux from entering into the radiated face or entrance face to exiting the opposite face to the total radiant energy projected onto the object. The higher the transmission is, the higher the brightness of the filter is. In general, if the transmission is greater than 85%, the brightness of the filter reaches the standard. It can be seen from the test results of the spacer of each example that the color contrast of spacer of each example reaches and exceeds the standard, i.e., the filter produces a relatively good effect. Using such spacer can prepare filters having good brightness.

2) Test for Thermal Resistance (Heat Resistance)

The filters of Examples 1 to 3 were subject to a test for thermal resistance. The test steps were as follows:

Each filter was cut to give two pieces of specimens having a dimension of 10 cm×10 cm, which were assigned as C and D, respectively.

The specimens C and D stood at 100° C. for 30 min, and then were removed. Each of specimens C and D was placed under a Scanning Electronic Microscope to obverse the surface morphology of the specimens. The experimental results are shown in Table 2.

TABLE 2

Thermal Resistance Results of Specimens of Various Filters of Examples 1 to 3

| | Example 1 | | Example 2 | | Example 3 | |
|---|---|---|---|---|---|---|
| | C | D | C | D | C | D |
| Surface Morphology | flat | flat | flat | flat | flat | flat |

Thermal Resistance refers to the ability that the filter resists high temperature, which is also one of reliable requirements of filters during following processes. The evaluation standard of spacer having good thermal resistance depends on the modification of surface morphologies of the filter before and after treatment, namely, the comparison between the surface morphology of the spacer of the filter after treatment and the surface morphology before treatment. In general, if the surface morphology does not vary before and after the thermal treatment and exhibits flat, the filter meets the standard. It can be seen from the test results of the spacer of the aforesaid examples that the thermal resistance of spacer of each example satisfies criteria, i.e., these spacers exhibit good thermal resistance, and thus the thus-prepared filters also have good thermal resistance.

Based on the above, the filter of the embodiment of the present invention produces good effect in the tests of both transmission and thermal resistance, and exhibit stable performances. The incorporation of the curable resin having a low curing temperature into the spacer composition for preparing the filter allows the prepared filter to have stable performances, while well saving the energy consumption required by the production of filter. It is not only environment-friendly, but also can reduce the production cost of display device well.

It is obvious that the aforesaid examples are not limitative, but illustrative. Persons skilled in the art can make other various variation or modification based on the aforesaid description. It is neither required nor possible to list all the embodiments exhaustively. Any apparent variation or modification extended therefrom is still encompassed within the scope of the present invention.

What is claimed is:

1. A curable resin comprising:
   1 part by weight of dianhydride;
   0. 6 to 2 parts by weight of diamine; and
   0.8 to 3 parts by weight of vinyl monomer,
   wherein:
   the dianhydride is selected from the group consisting of pyromellitic dianhydride, benzophenone tetracarboxylic dianhydride, biphenyl tetracarboxylic dianhydride, tetracarboxydiphthalic ether dianhydride or (hexafluoroisopropylidene)diphthalic anhydride;
   the diamine is selected from the group consisting of 3-aminobenzylamine, 2,2'-difluoro-4,4'-(9-fluorenylidene) diphenylamine, hexahydro-m-xylenediamine, 2,2-bis(3-amino-4-tolyl) hexafluoropropane, 2,7-diaminofluorene, or 4,4'-methylenebis(2-ethyl-6-methylaniline);
   the vinyl monomer is selected from the group consisting of vinyl chloride, styrene, methyl methacrylate, maleimide, butadiene, methyl acrylate, epoxy acrylate or bisphenol A type epoxy methacrylate.

2. A curable resin comprising:
1 part by weight of dianhydride;
0.6 to 2 parts by weight of diamine; and
0.8 to 3 parts by weight of vinyl monomer,
wherein: the vinyl monomer is selected from the group consisting of vinyl chloride, styrene, methyl methacrylate, maleimide, butadiene, methyl acrylate, epoxy acrylate or bisphenol A type epoxy methacrylate, the dianhydride is reacted with diamine to give a polyimide resin having the following formula:

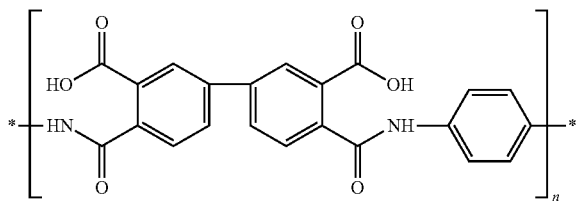

wherein n is 75 to 450.

3. The curable resin of claim 2, wherein n is 75 to 300.

4. The curable resin of claim 2, wherein n is 100, 120, 150, 180, 230, 245, or 270.

5. The curable resin of claim 2, wherein the curable resin is from a reaction of the polyimide resin and the vinyl monomer.

6. A spacer composition comprising:
2 to 30 parts by weight of the curable resin of the claim 1;
20 to 90 parts by weight of a solvent;
0.01 to 1 part by weight of an initiator; and
0.05 to 2 parts by weight of an additive.

7. The spacer composition of the claim 6, wherein the solvent has a boiling point of 30-90° C. at an atmospheric pressure.

8. The spacer composition of the claim 6, wherein the solvent is one or more selected from the group consisting of ether, pentane, dichloromethane, carbon disulfide, acetone, 1,1-dichloroethane, chloroform, methanol, tetrahydrofuran, n-hexane, trifluoroacetic acid, 1,1,1-trichloroethane, carbon tetrachloride, ethyl acetate, ethanol, butanone, cyclohexane, isopropanol, 1,2-dichloroethane, ethylene glycol dimethyl ether, trichloroethylene, and triethylamine.

9. The spacer composition of claim 6, wherein the initiator is one or more selected from the group consisting of α-aminoketone-based photoinitiators, acylphosphine oxide-based photoinitiators, α-hydroxyketone-based photoinitiators, and benzoyl formate-based photoinitiators.

10. The curable resin of the claim 1, wherein the diamine is one selected from the group consisting of 3-aminobenzylamine, and 2,2'-difluoro-4,4'-(9-fluorenylidene) diphenylamine.

11. The curable resin of the claim 1, wherein the diamine is one selected from the group consisting of hexahydro-m-xylenediamine, and 2,7-diaminofluorene.

12. The curable resin of the claim 1, wherein the diamine is one selected from the group consisting of 2,2-bis(3-amino-4-tolyl) hexafluoropropane and 4,4'-methylenebis(2-ethyl-6-methylaniline).

13. A spacer composition comprising:
2 to 30 parts by weight of the curable resin of the claim 1;
20 to 90 parts by weight of a solvent;
0. 01 to 1 part by weight of an initiator; and
0.05 to 2 parts by weight of an additive.

14. The spacer composition of claim 13, wherein the solvent has a boiling point of 30-90° C. at an atmospheric pressure.

15. The spacer composition of claim 13, wherein the solvent is one or more selected from the group consisting of ether, pentane, dichloromethane, carbon disulfide, acetone, 1,1-dichloroethane, chloroform, methanol, tetrahydrofuran, n-hexane, trifluoroacetic acid, 1,1,1-trichloroethane, carbon tetrachloride, ethyl acetate, ethanol, butanone, cyclohexane, isopropanol, 1,2-dichloroethane, ethylene glycol dimethyl ether, trichloroethylene, and triethylamine.

16. The spacer composition of claim 13, wherein the initiator is one or more selected from the group consisting of α-aminoketone-based photoinitiators, acylphosphine oxide-based photoinitiators, α-hydroxyketone-based photoinitiators, and benzoyl formate-based photoinitiators.

17. A curable resin comprising:
1 part by weight of tetracarboxydiphthalic ether dianhydride;
0. 6 to 2 parts by weight of 4,4'-methylenebis(2-ethyl-6-methylaniline); and
0.8 to 3 parts by weight of a vinyl monomer selected from the group consisting of vinyl chloride, styrene, methyl methacrylate, maleimide, butadiene, methyl acrylate, epoxy acrylate, and bisphenol A type epoxy methacrylate.

* * * * *